United States Patent
Eun et al.

(10) Patent No.: US 10,892,922 B2
(45) Date of Patent: Jan. 12, 2021

(54) PASSIVE INTERMODULATION (PIM) MEASUREMENTS IN COMMON PUBLIC RADIO INTERFACE (CPRI) SPECTRUM ANALYSIS

(71) Applicant: VIAVI SOLUTIONS INC., San Jose, CA (US)

(72) Inventors: Se Young Eun, Anyang (KR); Young-Hwan Kim, Gunpo-Si (KR)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 16/178,187

(22) Filed: Nov. 1, 2018

(65) Prior Publication Data

US 2020/0145264 A1   May 7, 2020

(51) Int. Cl.
*H04L 25/14* (2006.01)
*H04L 25/08* (2006.01)
*H04L 25/02* (2006.01)

(52) U.S. Cl.
CPC .......... *H04L 25/14* (2013.01); *H04L 25/0264* (2013.01); *H04L 25/08* (2013.01)

(58) Field of Classification Search
CPC ...... H04J 3/0685; H04J 3/0664; H04J 3/0632; H04J 3/0688; H04N 21/4305
USPC ......................................................... 370/503
See application file for complete search history.

(56) References Cited

U.S. PATENT DOCUMENTS

| | | | |
|---|---|---|---|
| 10,243,652 B2* | 3/2019 | Heath | H04B 1/1027 |
| 2013/0182753 A1* | 7/2013 | Delforce | G01R 31/08 |
| | | | 375/228 |
| 2015/0244414 A1* | 8/2015 | Yu | H04B 1/525 |
| | | | 455/73 |
| 2018/0070254 A1* | 3/2018 | Hannan | H04W 52/24 |
| 2019/0277956 A1* | 9/2019 | Gander | H04B 17/101 |

OTHER PUBLICATIONS

Theory_of_IMD_measurement_5C-043, (Theory of Intermodulation Distortion Measurement (IMD), Maury Microwave Corp., Jul. 27, 1999.*

(Continued)

*Primary Examiner* — Peter G Solinsky
*Assistant Examiner* — Sanjay K Dewan
(74) *Attorney, Agent, or Firm* — Mannava & Kang, P.C.

(57) ABSTRACT

A test device for detecting and measuring distance to passive intermodulation (PIM) is disclosed. The test device may comprise a receiver to receive a signal from a test point of a distributed cell site comprising a remote radio head (RRH) and a baseband unit (BBU) separated and connected via an optical feeder. The test device may also comprise a processor to detect passive intermodulation (PIM) and measure distance to the PIM (internal or external). For example, the processor may replace downlink IQ data in the signal with two-tone waveform IQ data, transmit the two-tone waveform IQ data to the RRH, and to monitor uplink spectrum to detect PIM, where the uplink spectrum may comprise uplink IQ data from the RRH. The processor may also perform uplink spectrum analysis using radio frequency (RF) monitoring, measure a time delay for the two-tone waveform and the detected PIM, and calculate a distance to the PIM based on the time delay.

20 Claims, 11 Drawing Sheets

(56) References Cited

OTHER PUBLICATIONS

On the Use of Multitone Techniques for Assessing RF Components' Intermodulation Distortion, IEEE Transactions on Microwave Theory and Techniques, vol. 47, No. 12, Dec. 1999.*
IMD Measurement with E5072A ENA Series Network Analyzer, Agilent Technologies, Jun. 2012.*
Intermodulation Distortion Measurements on Modern Spectrum Analyzers, Application Note, Dr. Florian Ramian, Jun. 2012.*
Intermodulation Reviewed, Hearing unwanted signals on your favorite repeater? Intermodulation may be the culprit!, by David W.Potter, W2GZD, May 1983.*
Anritsu, Intermodulation Distortion (IMD) Measurements using the 37300 series Vector Network Analyzer, Application Note, Sep. 2000 Rev A.*
Agilent EESof EDA, Practical Intercept Measurements and Cascaded Intermod Equations, May 14, 2007.*

* cited by examiner

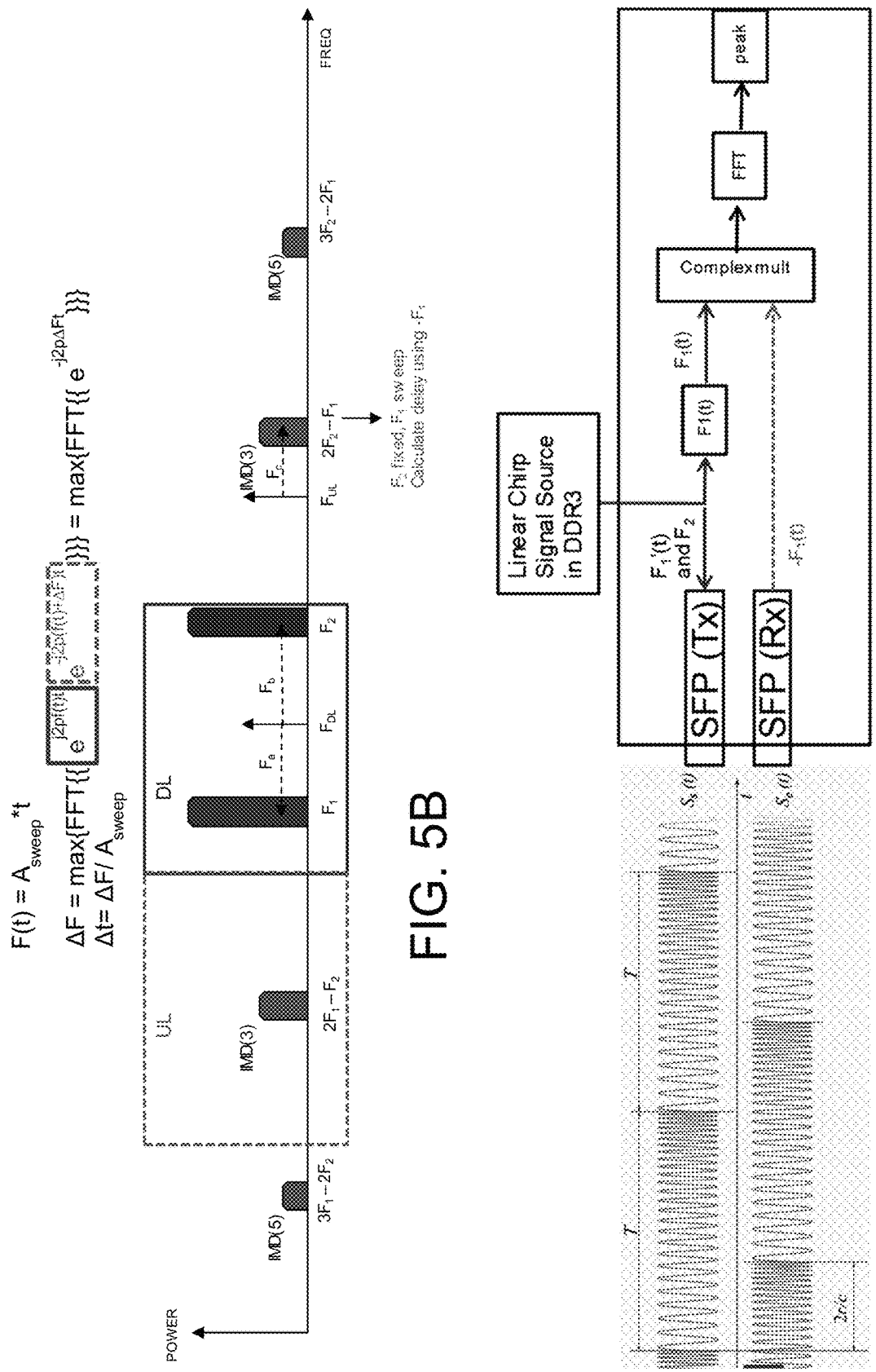

PASSIVE INTERMODULATION (PIM) MEASUREMENTS IN COMMON PUBLIC RADIO INTERFACE (CPRI) SPECTRUM ANALYSIS

TECHNICAL FIELD

This patent application relates generally to telecommunications networks, and more specifically, to systems and methods for testing telecommunications networks by detecting and measuring distance to passive intermodulation (PIM) in radio frequency (RF) power in common public radio interface (CPRI) spectrum analysis of a cell site.

BACKGROUND

A modern telecommunications cell site relies on a distributed architecture, where a base-station transceiver subsystem (BTS), for example, is divided into two main elements. The first is a baseband unit (BBU) that typically resides at the base or bottom of a cell tower. The second is a remote radio head (RRH) that performs radio frequency (RF) functions near antennas near the top of a cell tower. Recent technological developments have been made to provide communications between the BBU and the RRH. For instance, the BBU and the RRH may communicate via a common public radio interface (CPRI). In particular, RF over CPRI (RFoCPRI™) technology has enabled effective RF analysis from the base of the tower, minimizing dangerous tower climbs and associated costs and inefficiencies.

A technical problem associated with this distributed architecture, however, includes intermodulation in passive components. For instance, intermodulation distortion (IMD) may be exhibited when two or more signals are transmitted in a cabling system with improper conductivity characteristics, such as loose jumpers, bent cables, or variations in metal due to environment changes. Such IMD typically results in the generation of signals as products or multiples of actually transmitted signals, commonly known as passive intermodulation (PIM).

As a result, a technique that detects and measures distance to PIM in RFoCPRI-based systems may be helpful to increase network testing efficiencies and overcome shortcomings of conventional technologies.

BRIEF DESCRIPTION OF DRAWINGS

Features of the present disclosure are illustrated by way of example and not limited in the following Figure(s), in which like numerals indicate like elements, in which:

FIGS. 5A-5D illustrate a data flow for detecting and measuring distance to PIM in a CPRI-based system, according to an example.

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, a distributed cell site may have a baseband unit (BBU) that resides at the base or bottom of a cell tower and a remote radio head (RRH) that performs radio frequency (RF) functions located near antennas at the top of the cell tower. Modern cell architecture has also replaced coax-based feeders with fiber-based ones to connect the BBU and RRH. This change has reduced problems associated with signal loss and reflections. However, since RF interfaces reside on the RRH, most RF maintenance, troubleshooting, or measurements still requires access at the top of a cell tower. Tower climbs and access to the RRH may burdensome, inefficient, and even hazardous.

Recent advancements in technology have made it possible for the BBU and the RRH to communicate via a common public radio interface (CPRI). In particular, RF over CPRI (RFoCPRI™) technology has enabled effective RF analysis from the base of the tower, minimizing dangerous tower climbs and associated costs and inefficiencies. However, a technical problem associated with this distributed architecture includes intermodulation in passive components. Intermodulation distortion (IMD) may be exhibited when two or more signals are transmitted in a cabling system with improper conductivity characteristics, such as loose jumpers, bent cables, or variations in metal due to environment changes. Such IMD typically results in the generation of signals as products or multiples of actually transmitted signals, commonly known as passive intermodulation (PIM). Accordingly, techniques for detecting and measuring distance to PIM in RFoCPRI-based systems are disclosed herein. may be helpful to increase network testing efficiencies and overcome shortcomings of conventional technologies.

Figure 1:
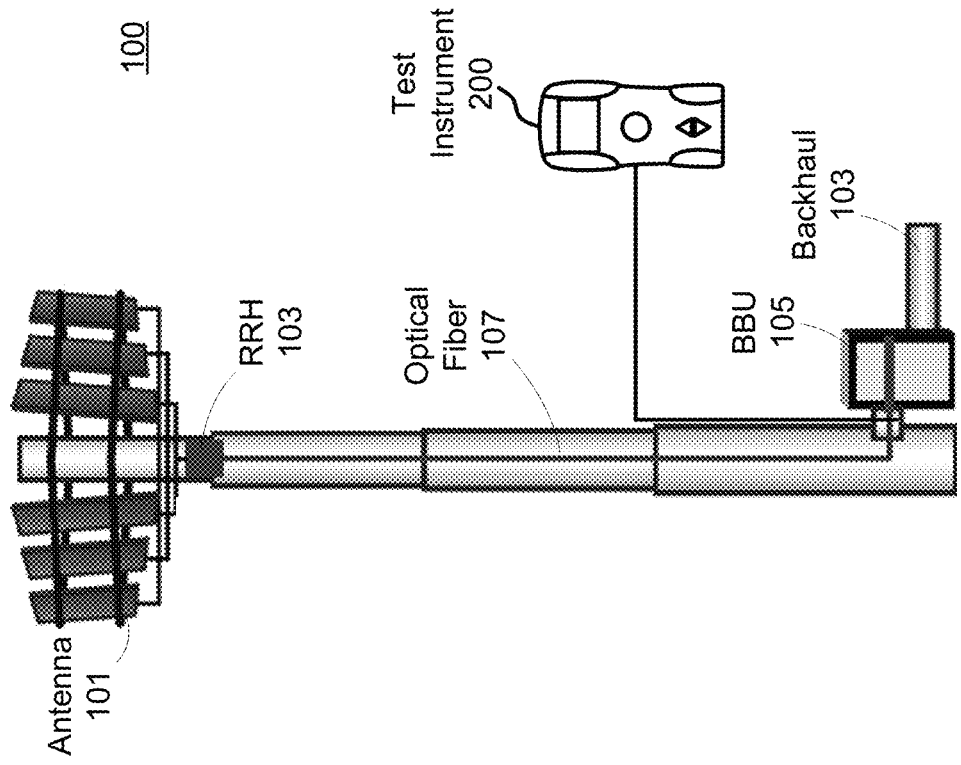
FIG. 1 illustrates a distributed cell site 100 with a test instrument that detects and measures distance to PIM and performs common public radio interface (CPRI) spectrum analysis, according to an example.

FIG. 1 illustrates a distributed cell site 100 with a test instrument that detects and measures distance to PIM and performs CPRI spectrum analysis, according to an example. As shown, a cell site 100 may be a tower with one or more antennas 101 near the top of a cell tower. The cell site 100 may be a distributed cell site having at least one remote radio head (RRH) 103 that performs radio frequency (RF) functions. The RRH 103 may be located near antennas 101 at the top of the cell tower. The cell site 100 may also have at least one baseband unit (BBU) 105 that resides at the base or bottom of the cell tower. An optical fiber 107 (or fiber-based or optical feeder) may connect the BBU 105 and the RRH 103. The BBU 105 may be connected to a backhaul 109, which may include base station controllers or other components that provide network connectivity standard to telecommunications industries. A test instrument 200 may measure signals at the cell site 100 at various test points.

The RRH 103 may include various components and circuitry. For example, the RRH 103 may include radio equipment (RE) having various RF circuitry, such as converters, filters, oscillators, amplifiers, modulators, etc. These components may allow the RRH to covert optical signals to electrical signals, and vice versa. This may be particularly useful in CPRI. Other features of the RRH 103 may include receiving/transmitting a desired band of signals from/to antennas, amplifying signals to desired power levels, filtering signals, converting signals, or other related actions.

The BBU 105 may a unit that processes baseband at call sites for telecommunications systems. Baseband may refer a signal that has a very narrow and near-zero frequency range, e.g., low-pass or non-modulated signal. The BBU 105 may include, among other things, radio equipment control (REC) which is responsible for communication through the physical interface. The BBU 105 may be connected to a backhaul 109, which in turn may be connected to a core telecommunications network. Backhaul 109 may be standard industry technologies, such as free-space optical, microwave relay, Ethernet, WiMAX, SONET, DSL, or other similar technologies.

Figure 2:
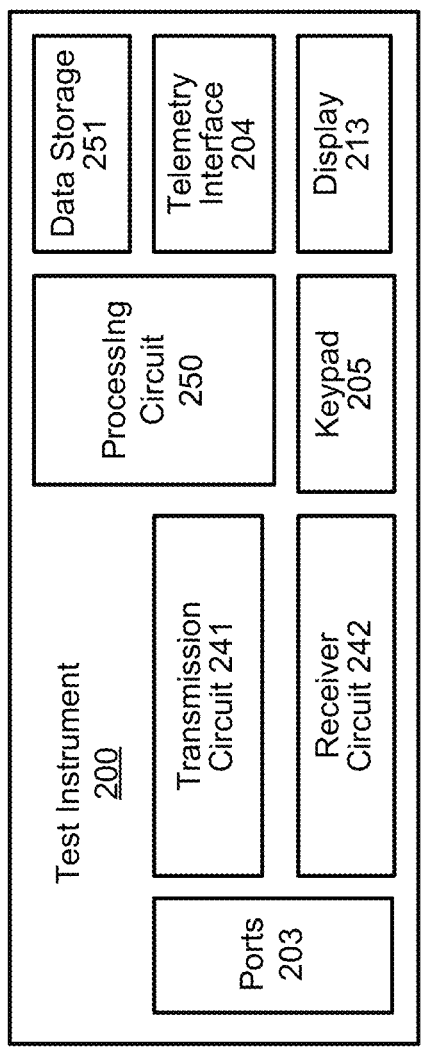
FIG. 2 illustrate a test instrument for detecting and measuring distance to PIM in a CPRI-based system, according to an example.

FIG. 2 illustrate a test instrument for detecting and measuring distance to PIM in a CPRI-based system, according to an example. The test instrument 200 may include one or more ports 203 for connecting the test instrument 200 to a test point, such as the test point 309A shown in FIG. 3A. The ports 203 may include connectors for connecting to cables at a cell site carrying traffic for upstream and downstream channels. The test instrument 200 may include a telemetry interface 204 for connecting to a telemetry channel, such as a WiFi interface, Bluetooth interface, cellular interface or another network interface. The test instrument 200 may also connect to a remote device via the telemetry interface 204.

The test instrument 200 may include one or more ports 203 to connect to various test points at the cell site, such as the front haul of the BBU 105. In an example, the port(s) may include coaxial or optical RF cable connectors. It will be appreciated that test instrument 200 may also have other non-cable ports, for example, to connect to a computer or to an external display, such as, but not exclusively, one or more USB ports and the like.

The test instrument 200 may include a user interface which may include a keypad 205 and display 213. The display 213 may include a touch screen display. A user may interact with the test instrument 200 via the user interface to enter information, select operations, view measurements, examine signal profiles, communicate with other devices, etc.

A data storage 251 may store any information used by the test instrument 200 and may include memory or another type of known data storage device. The data storage 251 may store power measurements and/or any other measurements or data used by the test instrument 200. The data storage 251 may include a non-transitory computer readable medium storing machine-readable instructions executable by processing circuit 250 to perform operations of the test instrument 200.

A transmission circuit 241 may include a circuit for sending test signals into the cell site to perform various tests. The transmission circuit 241 may include encoders, modulators, and other known component for transmitting signals in the network. A receiver circuit 242 may include components for receiving signals from the network. The transmission circuit 241 and/or the receiver circuit 242 may also include other components, such as a demodulator, a decoder, an ADC, and/or other circuit components or elements.

Figure 3A:
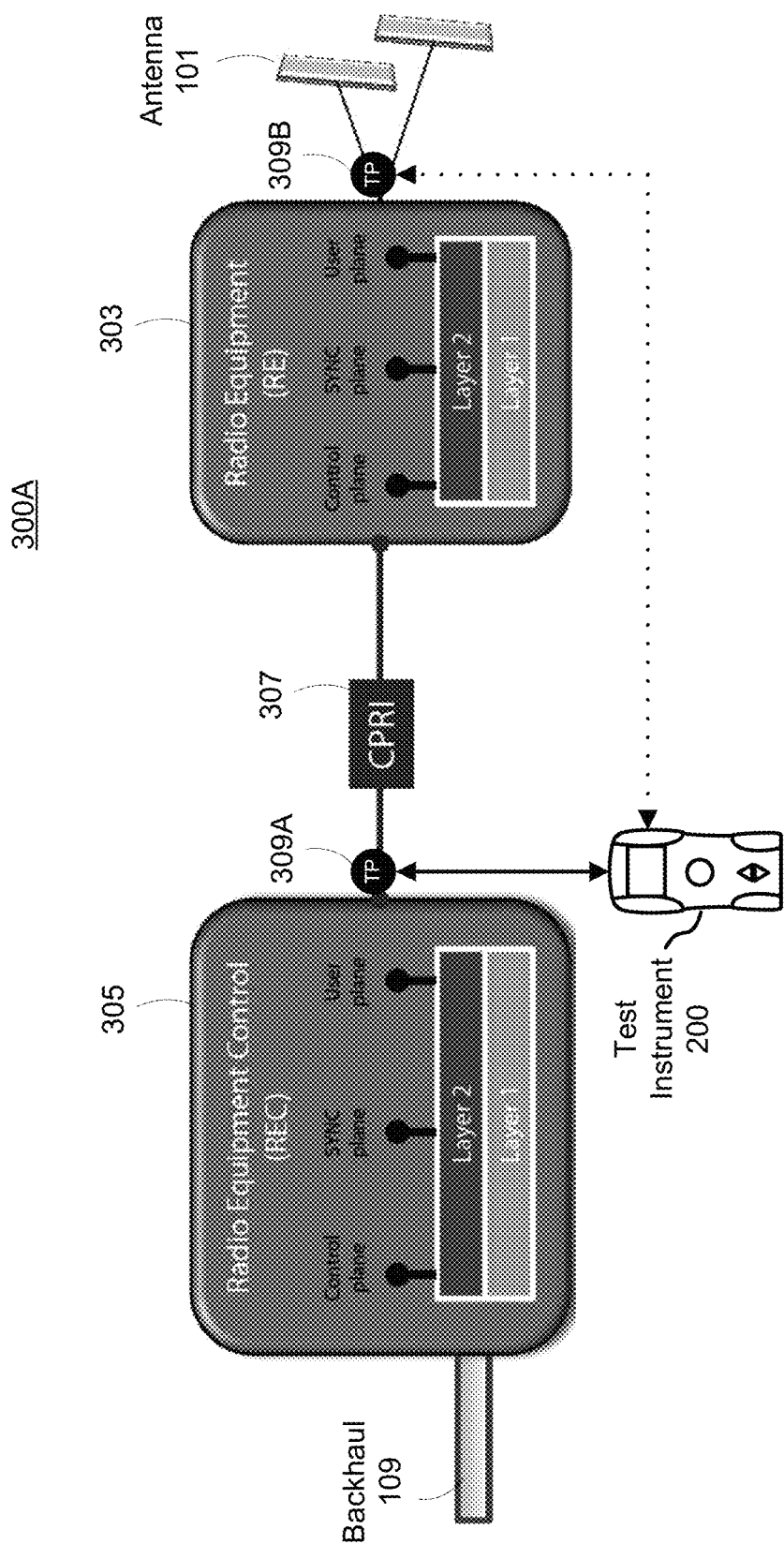
FIG. 3A illustrates common public radio interface (CPRI) multiplexing with test points, according to an example.
Figure 3B:
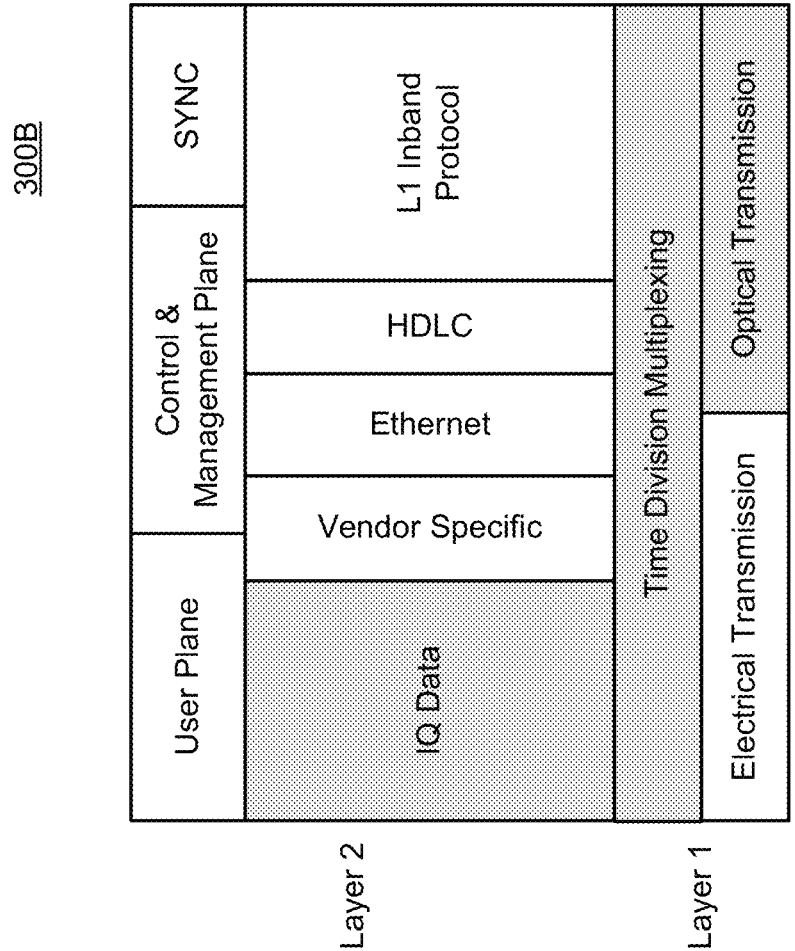
FIG. 3B illustrates a common public radio interface (CPRI) protocol, according to an example.
Figure 3C:
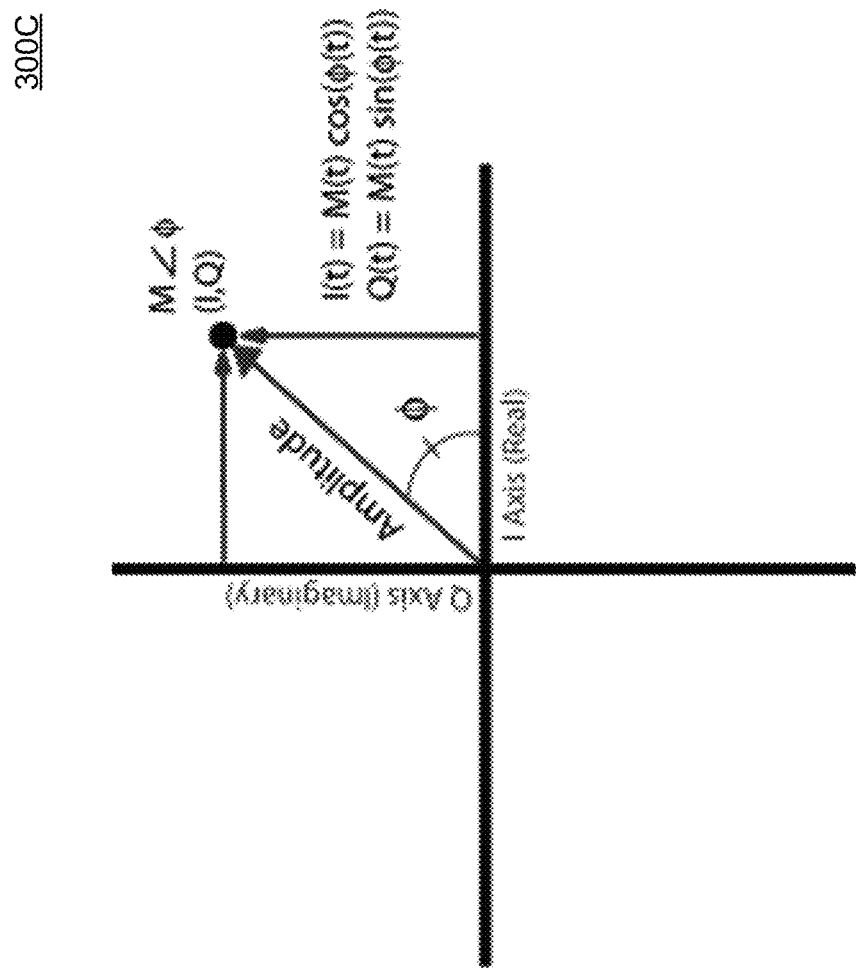
FIG. 3C illustrates IQ data represented in polar form for detecting and measuring distance to PIM in a CPRI-based system, according to an example.
Figure 3D:
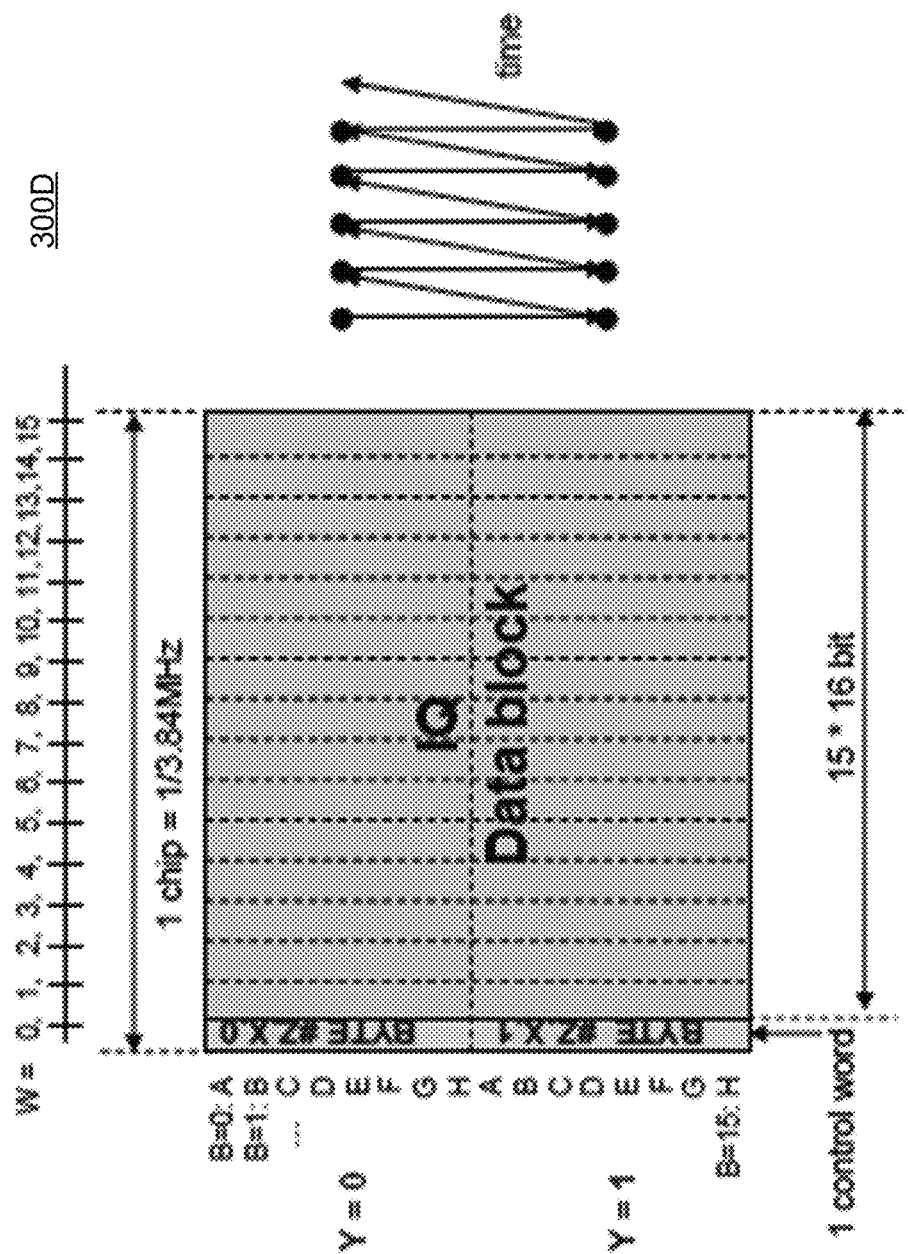
FIG. 3D illustrates a frame structure for an IQ data block measuring RF power using common public radio interface (CPRI) spectrum analysis, according to an example.
Figure 4:
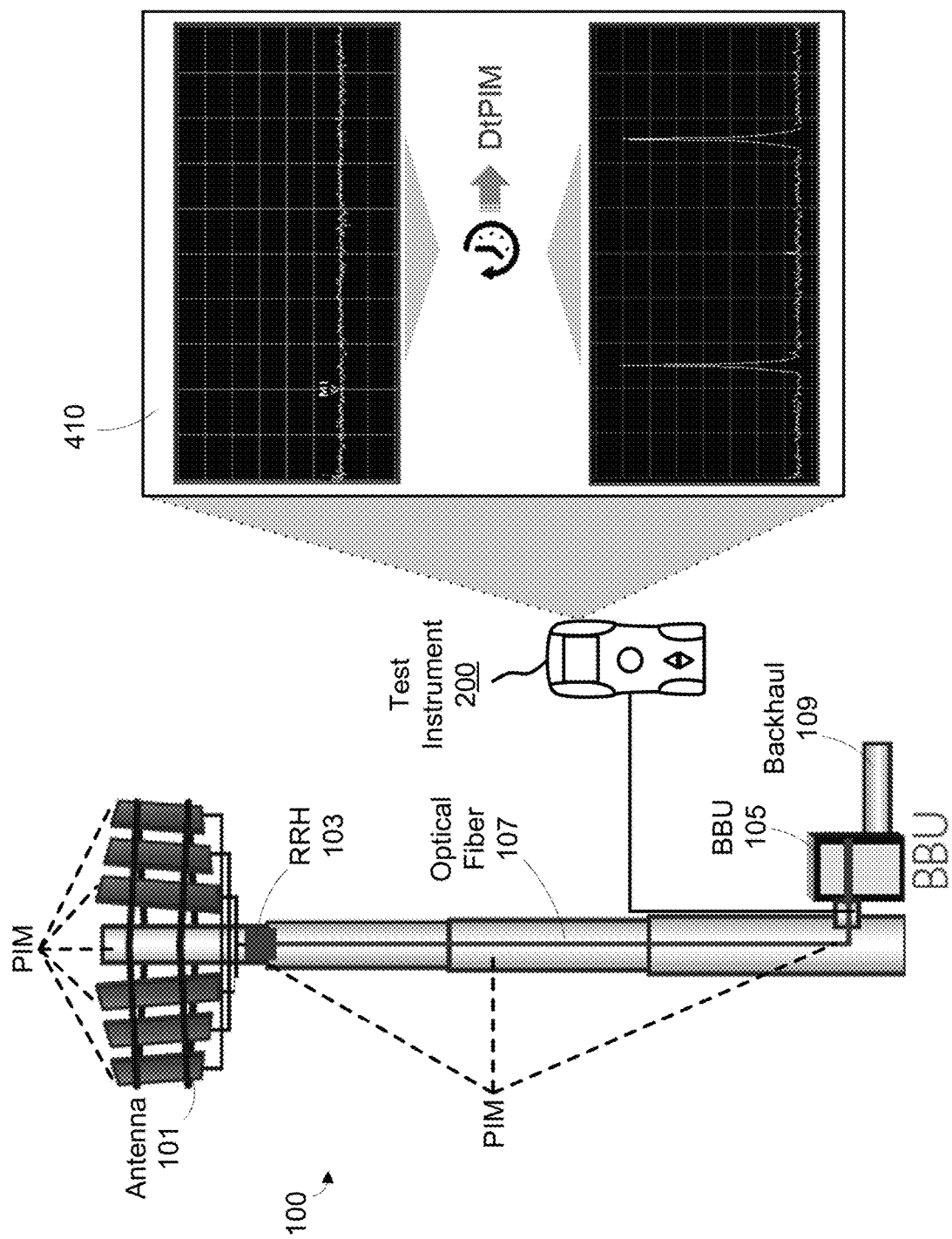
FIG. 4 illustrates a distributed cell site with a test instrument for detecting and measuring distance to PIM in a CPRI-based system, according to an example.

A processing circuit 250 may include any suitable hardware to perform the operations of the test instrument 200 described herein, including the operations described with respect to FIGS. 3-5 and the techniques described herein, or otherwise. For example, the operations may include measuring and testing operations. The processing circuit 250 may include other components as well, such as a signal/interference analyzer, spectrum analyzer, profile/spectrum generator, and other measurement and reporting components. The hardware of the test instrument 200, including the processing circuit 250, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument 200 described herein may be performed by the processing circuit 250 or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile. It should be appreciated that the test instrument 200 may include components other than what is shown.

A cooperative industry effort defined as CPRI may be a specification for an interface between a radio equipment control (REC) (e.g., located at or near the BBH 105) and a radio equipment (RE) (e.g., located at or near the RRH 103). In some examples, CPRI may the specification for interfacing an REC and RE when optical fiber (or fiber-optic feeder) is deployed.

FIG. 3A illustrates common public radio interface (CPRI) multiplexing 300A, according to an example. As shown, radio equipment (RE) 303 may be connected to antennas 101 for over-air interface. The RE 303 may be connected to radio equipment control (REC) 305 via an optical fiber (e.g., CPRI 307). The REC 305 may be connected to backhaul 109 for network interface.

The CPRI interface may be characterized by a full-duplex, synchronized, and steady transfer of digital baseband data that guarantees high bandwidth and high throughput with low latency. Less time-critical data, such as control information (e.g., for link setup), as well as time-aligned data (e.g., for Rx and Tx gain control) may be transferred in addition to user information.

As depicted, three different information flows may be multiplexed over CPRI. These may include: (i) user-plane data, (ii) control- and management-plane data, and (iii) synchronization-plane data. The clock and timing control may ensure that the REC 305 and RE 303 are synchronized.

Timing information may be included in baseband data. A frame structure with control words (CWs) may provide a basis for transfer of that information. The RE 303 may synchronize its clock and frame timing to a master reference (clock recovery) at the REC 305. This may be essential to map/demap or code/decode digital data correctly as well as to resend CPRI data to another RRH in a chain topology.

Referring back to FIG. 1, the test instrument 200 may test and measure signals at various test points at the cell site. In an example, as shown in FIG. 3A, the test instrument 200 may measure and analyze signals from test point 309A, a point along the optical fiber 107 (or CPRI 307 in FIG. 3) at a front haul area near the REC 305. Taking advantage of RFoCPRI technology, the test instrument 200 may measure and analyze signals at an uplink (UL) of the optical fiber 107. In this way, even though the operator or technician may be at test point 309A near the BBU, he or she may be effectively measuring the signal between the antenna and RRH at test point 309B, without having to climb the tower of the cell site. It should be appreciated that while techniques described herein are directed to power measurements, RFoCPRI spectrum analysis may provide a host of measurements, including various RF metrics, such as DTF, VSWR, as well as optical power, integrity, performance, etc. As disclosed herein, the test instrument 200 may also detect and measure distance to PIM caused by IMD.

FIG. 3B illustrates a common public radio interface (CPRI) protocol 300B, according to an example. The CPRI protocol 300B may define Layer 1 (PHY) and Layer 2 (MAC) of the Open System Interconnection (OSI) model. Higher layers may not be specified by CPRI but defined and implemented by vendors of the REC and RE. In other words, there are many possibilities for using CPRI data containers for individual users, as well as control and management information. The user (baseband IQ), control and management, and synchronization data streams may be multiplexed over the same physical interface. In this example, Layer 1 may include electrical transmission and/or optical transmission, as well time division multiplexing (TDM). Layer 2 may include information flows that involve IQ data, vendor specific, Ethernet, HDLC, and/or L1 in-band protocol.

FIG. 3C illustrates IQ data represented in polar form for measuring RF power using common public radio interface (CPRI) spectrum analysis 300C, according to an example. It should be appreciated that RF communication systems use advanced forms of modulation to increase the amount of data that can be transmitted in a given amount of frequency spectrum. Signal modulation may be divided into two broad categories: analog modulation and digital modulation. IQ data may then be understood as a translation of amplitude and phase data from a polar coordinate system to a Cartesian (X, Y) coordinate system. As shown in FIG. 3C, using trigonometry, polar coordinate sine wave information may be converted into Cartesian I/Q sine wave data. These two representations may be equivalent and contain the same information, just in different forms.

Accordingly, IQ data may represent a message signal, and projections onto the I and Q axes may represent individual I and Q waveforms corresponding to a PM sine wave with fixed magnitude and oscillating phase. Because the IQ data waveforms are Cartesian translations of polar amplitude and phase waveforms, additional analysis may be needed to determine a nature or content of the message signal. Such analysis may help measure power, interference, signal performance, etc. of the message signal.

FIG. 3D illustrates a frame structure for an IQ data block measuring RF power using common public radio interface (CPRI) spectrum analysis 300D, according to an example. An IQ data block structure for a 1,228.8 Mb/s CPRI line bit rate may be shown in 300D. IQ data may be transferred in the form of a frame structure with basic, hyper, and radio frames. A basic frame may consist of 16 words. The first word (W0) of each frame may be a CW. The remaining words (W1-15) may be used for user IQ data (IQ data block).

As described above, intermodulation distortion (IMD) may be exhibited when two or more signals are transmitted in a cabling system with improper conductivity characteristics, such as loose jumpers, bent cables, or variations in metal due to environment changes. In a RFoCPRI-based system, such IMD typically results in the generation of signals as products or multiples of actually transmitted signals, commonly known as passive intermodulation (PIM). Accordingly, techniques for detecting and measuring distance to PIM in RFoCPRI-based systems may be helpful to increase network testing efficiencies and improve telecommunications performance.

FIG. 4 illustrates a distributed cell site with a test instrument for detecting and measuring distance to PIM in a CPRI-based system, according to an example. PIM may be experienced at various points in the distributed cell site 100. For example, internal PIM may be exhibited along the optical fiber 107, e.g., near the RRH 103, near the BBU 105, or at other various locations, such as a combiner (not shown), etc. External PIM may also be exhibited near the antenna 101, and may be varied based on tilt, position, strength, etc. As more frequencies are being used for different technologies, external PIM may be problematic for a cell site. Since the PIM uplink (UL) band reduces the reverse sensitivity of a cell site, there may be an impact on cell coverage as well. In other words, downlink (DL) PIM may affect uplink (UL) PIM.

As shown, the test instrument 200 may be connected at a test point near a front haul of the BBU 105. More specifically, the test instrument 200 may monitor CPRI uplink (from RRH). While examples described herein are directed to monitoring UL channels, it should be appreciated that test instrument 200 may also monitor downlink (DL) (from BBU) signals as well.

In general, the test instrument 200 may perform a variety of maintenance, troubleshooting, and performance operations at a ground level via optical fiber 107 at a front haul of the BBU 105. For instance, the test instrument 200 may use RFoCPRI to verify CPRI control signals and may also extract RF (IQ) data transmitted between the BBU and RRU. This may enable monitoring and analysis of interference of mobile terminals (uplink), as well as the radio's signal analysis (uplink/downlink).

For detecting and measuring distance to PIM, the test instrument 200 may replace downlink (DL) with 2-tones at an edge of the channel. The test instrument 200 may then monitor and analyze the uplink (UL) spectrum. This may be achieved, for example, using RF monitoring using spectrum analysis or other similar technique. The test instrument 200 may also measure time delay. Using the 2 tone Tx vs PIM Rx delay, a distance to PIM may be determined.

Since PIM on the uplink (UL) band may reduce the reverse sensitivity of a cell site, there may be significant impact on cell coverage. In other words, downlink (DL) PIM may affect uplink (UL) PIM. Therefore, PIM may therefore be detected, using the test instrument 200, by injecting a two tones waveform on the payload of a CPRI link in accordance to carrier configurations of the RRH. By altering map position on CPRI payload, a test instrument 200, for example, may allow or instruct the RRH to transmit a two-tone on the same antenna, or a single tone from two different antennas with a rated power.

Once a PIM frequency product is detected, it may be important to isolate location of PIM source so that it may be properly resolved since the location of the PIM may be remote from a technician. For internal PIM, a transmission line and/or junction may be inspected to determine and pinpoint the PIM source. A test instrument 200, for instance, may show location and magnitude of the PIM product while the transmission line is being checked or inspected. If external PIM, resolution may require an additional coordinate action. For example, this may involve altering antenna configurations, such azimuth, tilt, and TX power, while monitoring magnitude of the PIM. In this way, coverage at the cell cite may be measured to determine impact. As shown in FIG. 4, measurements 400 may be used to determine distance to PIM.

It should also be appreciated that verification of PIM during installation may also be provided. For example, when a tower crew is on site, upon configuration verification and interference clearing, PIM measurements may be performed to verify an antenna feeder. By addressing internal PIM issues, a number of tower climbs may be reduced as well, which in turn reduces installation costs. Moreover, loosing or corrosions at a junction may cause internal PIM as well. External PIM may also result from changes of a cell site. Thus, by identifying external PIM without power climbing or disassembling an antenna feeder may improve signal resolution efficiencies.

Figure 5A:
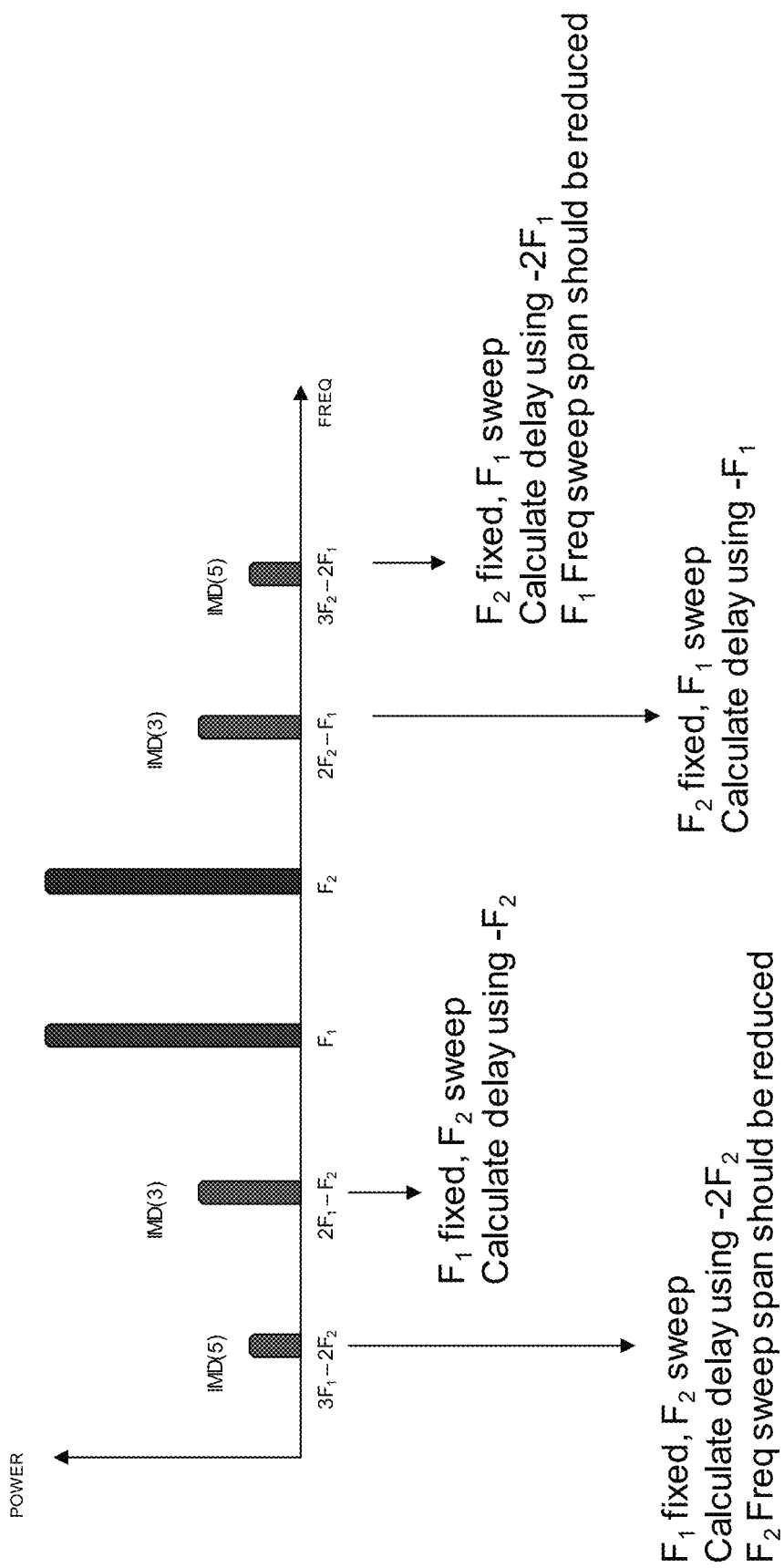
Figure 5D:
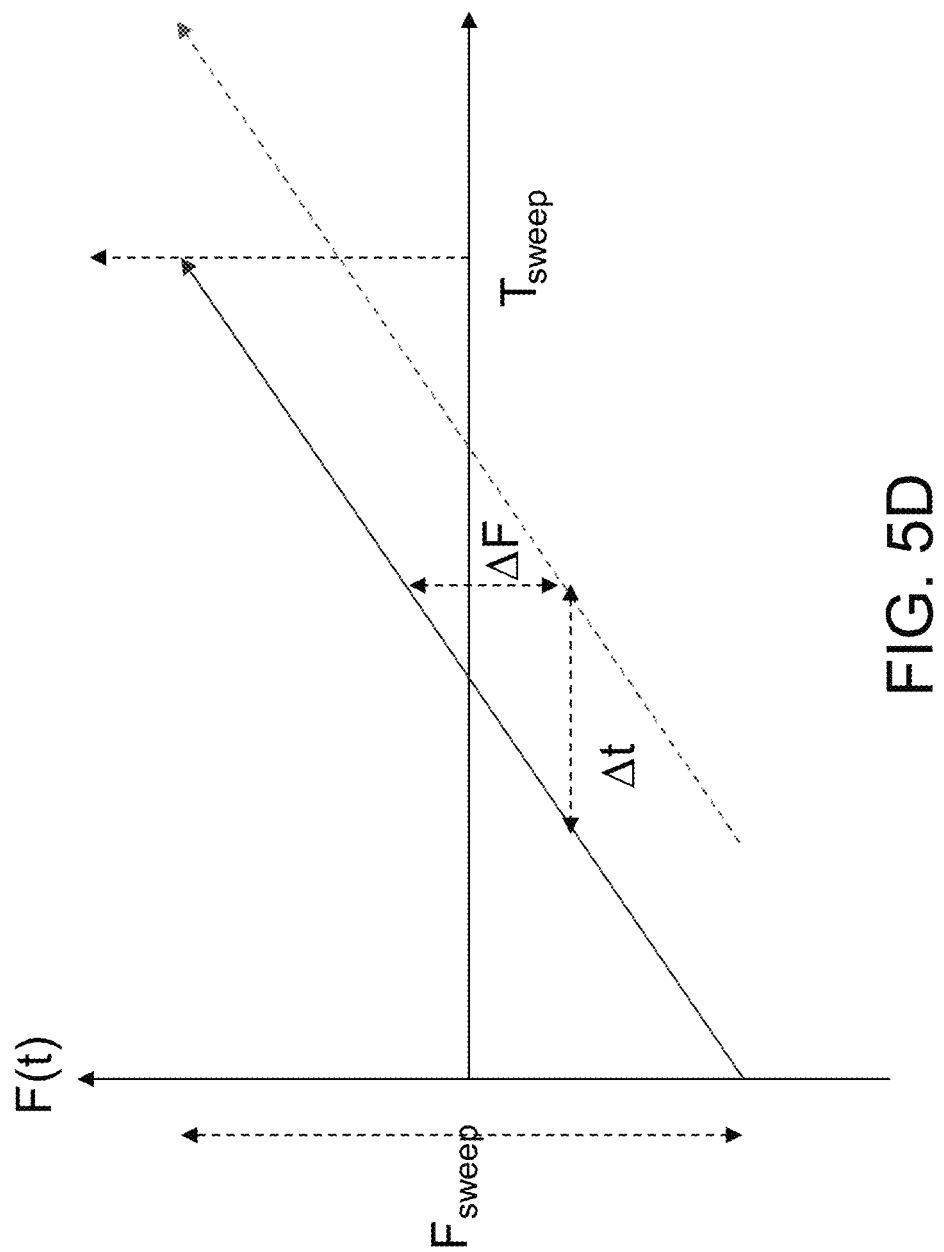

FIGS. 5A-5D illustrate data flows for detecting and measuring distance to PIM in a CPRI-based system, according to an example. In FIG. 5A, a frequency-modulated continuous-wave (FMCW) technique may be used for each intermodulation (IM) order. In an example, a sweep frequency may be decided to maximize IMD frequency sweep span on returned frequency band, the results of which may be shown in FIG. 5A.

In FIG. 5B, an implementation of a frequency-modulated continuous-wave (FMCW) technique may be provided. In order to calculate F1 and F2, the following expressions or policies may be used:

$$F_{PIM}=2F_2-F_1=2(F_{DL}+F_b)-(F_{DL}+F_a)=F_{DL}+2F_b-F_a$$

$$F_c=F_{PIM}-F_{UL}=F_{DL}-F_{UL}+2F_b-F_a$$

If $F_{DL}-F_{UL}+2F_b=0$, then $F_a$ could be swept in full span

In FIG. 5C, an FPGA may be shown that may have an input for linear chirp signal sources in a DDR3 for example. The FPGW may be used to determine and calculate F1 and F2 using the expressions above. Small form-factor pluggable (SFP) modules also be used. Once a frequency sweep has been completed on a complex domain, a graph 500D of FIG. 5D may be provided. As shown, various determinations may be made. Assuming $F_{sweep}$ represents a frequency sweep in LTE 20 MHz, WCDMA 5 MHz, etc. (depending on service DL UL band), the following may be shown:

$$F(t) = A_{sweep} * t$$

$$\Delta F = \max\{FFT\{[\overline{e^{j2\pi f_0^t}\cdot \overline{e^{-j2\pi(f+\Delta F)t}}}]\}\} = \max\{FFT\{e^{-j2p\Delta Ft}\}\}$$

$$\Delta t = \Delta F / A_{sweep}$$

where $e^{j2pf(t)t}$ represents the top (solid) line (for DL) and $e^{-j2p(f(t)+DF)t}$ represents the bottom (dashed) line (for UL). By using the FMCW technique, detection and measurement of distance to PIM may be determined. It should be appreciated that other various techniques may also be provided.

Figure 6:
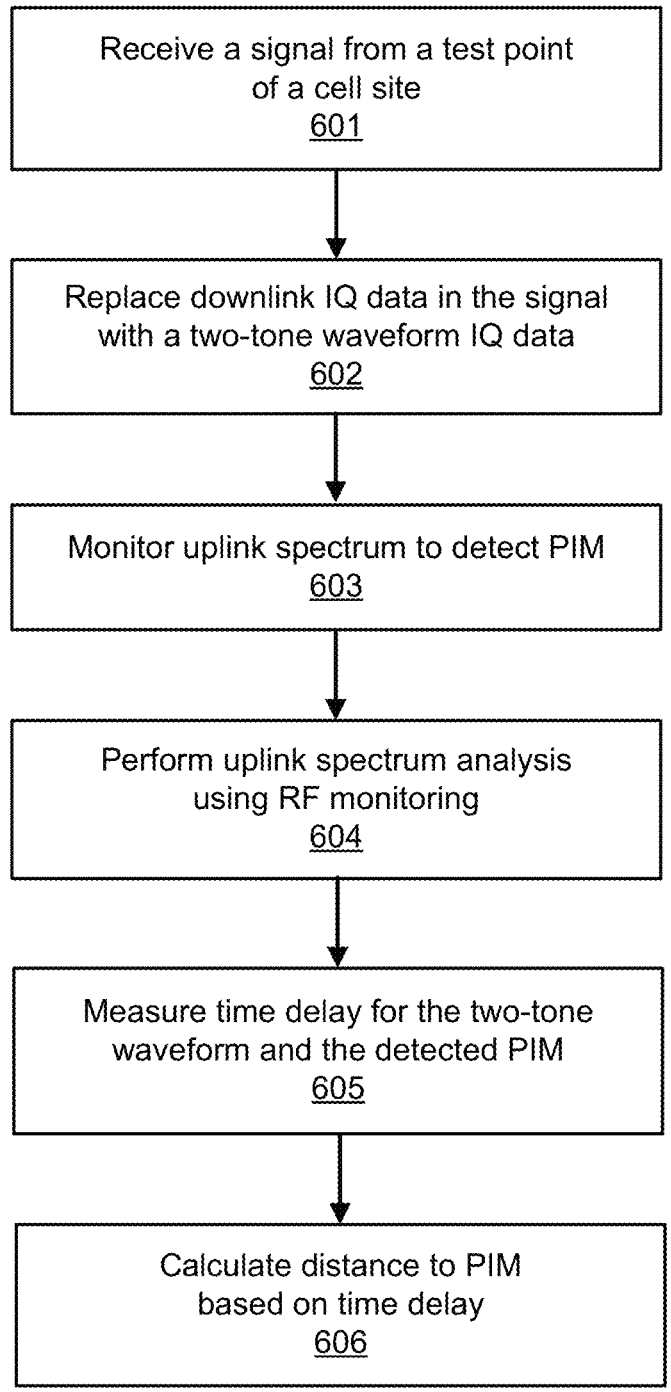
FIG. 6 illustrates a flow chart of a method for detecting and measuring distance to PIM in a CPRI-based system, according to an example.

FIG. 6 illustrates a flow chart of a method for detecting and measuring distance to PIM in a CPRI-based system, according to an example. The method 600 is provided by way of example, as there may be a variety of ways to carry out the method described herein. Although the method 600 is primarily described as being performed by test instrument 200 in at least scenarios depicted in FIGS. 1-5, the method 600 may be executed or otherwise performed by one or more processing components of the test instrument 200, or by another system or a combination of systems. Each block shown in FIG. 6 may further represent one or more processes, methods, or subroutines, and one or more of the blocks may include machine readable instructions stored on a non-transitory computer readable medium and executed by a processor or other type of processing circuit to perform one or more operations described herein.

At block 601, the receiver circuit 242 of the test instrument 200 may receive a signal from a test point of a cell site. In an example, the signal may be a radio frequency over common public radio interface (RFoCPRI) signal. The signal may include downlink IQ data. In an example, the cell site may be a distributed cell site comprising a remote radio head (RRH) and a baseband unit (BBU) separated and connected via an optical feeder. The test point may at a front haul of the BBU or near the BBU of the cell site. Other various components and/or configurations may also be provided.

The processing circuit 250 of the test instrument 200 may use the received signal to detect passive intermodulation (PIM) and/or measure distance to the PIM. It should be appreciated that PIM may be internal PIM or external PIM, as described herein.

At block 602, the processing circuit 250 of the test instrument 200 may replace downlink IQ data in the signal with two-tone waveform IQ data.

At block 603, the processing circuit 250 of the test instrument 200 may transmit the two-tone waveform IQ data to the RRH. As described above, the test instrument 200 may allow or instruct the RRH to transmit a two-tone on the same antenna, or a single tone from two different antennas with a rated power.

At block 604, the processing circuit 250 of the test instrument 200 may monitor uplink spectrum to detect PIM. In an example, the uplink spectrum may include uplink IQ data from the RRH. As described herein, IQ data may include a significant amount of information, which may be used and leveraged to detect PIM.

At block 605, the processing circuit 250 of the test instrument 200 may performing uplink spectrum analysis using radio frequency (RF) monitoring. Although uplink spectrum analysis may be performed at the test instrument 200, it should be appreciated that examples where such analysis is performed remotely, entirely or partially, may also be provided.

At block 606, the processing circuit 250 of the test instrument 200 may measuring a time delay for the two-tone waveform and the detected PIM. In an example, measuring time delay may be based on a frequency-modulated continuous-wave (FMCW) technique, as described above. It should be appreciated that other various time-delay measuring techniques may also be provided.

At block 606, the processing circuit 250 of the test instrument 200 may calculating a distance to the PIM based on the time delay. In an example, calculating the distance to the PIM may be based on time-distance resolution technique, as described herein. It should be appreciated that other distance calculation or measuring techniques may also be provided.

It should also be appreciated that the test instrument 200 may also provide other components not shown. For example, middleware (not shown) may be included as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the test instrument 200, for example, may also be performed partially or in full by other various components of the overall system.

It should be appreciated that the data stores described herein may include volatile and/or nonvolatile data storage that may store data and software or firmware including machine-readable instructions. The software or firmware may include subroutines or applications that perform the functions of the test instrument 200 and/or run one or more application that utilize data from the test instrument 200 or other communicatively coupled system.

The various components, circuits, elements, and interfaces, may be any number of hardware, network, or software components, circuits, elements, and interfaces that serves to facilitate communication, exchange, and analysis data between any number of or combination of equipment, protocol layers, or applications. For example, the interfaces described herein may each include a network interface to communicate with other servers, devices, components or network elements via a network.

Although examples are directed to detecting and measuring distance to PIM using radio frequency (RF) power in common public radio interface (CPRI) spectrum analysis of a cell site, it should be appreciated that that the test instrument 200 may also use these and other various techniques in order to provide interference analysis, signal analysis, and/or other related RF measurements. Ultimately, the systems and methods described herein may minimize cell towner climbs and improve safety, reduce number of testing devices, increase accuracy and reliability, and significantly reduce maintenance and operation expenses.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A test device, comprising:
    a receiver to receive a signal from a test point of a cell site; and
    a processor to detect passive intermodulation (PIM) and measure distance to the PIM, wherein downlink PIM affects uplink PIM, the detection of and measurement of distance to the PIM achieved by:
        replacing downlink IQ data in the signal with two-tone waveform IQ data, wherein the two-tone waveform IQ data is acquired from a single antenna or from two single tones from two separate antennas and represents a translation of amplitude and phase data from a polar coordinate system to a Cartesian (x, y) coordinate system;
        transmitting the two-tone waveform IQ data to a remote radio head (RRH);
        monitoring uplink spectrum to detect PIM, wherein the uplink spectrum comprises uplink IQ data from the RRH;
        performing uplink spectrum analysis using radio frequency (RF) monitoring;
        measuring a time delay for the two-tone waveform and the detected PIM; and
        calculating a distance to the PIM based on the time delay.

2. The test device of claim 1, wherein the signal is a radio frequency over common public radio interface (RFoCPRI) signal, the signal comprising downlink IQ data.

3. The test device of claim 1, wherein the cell site is a distributed cell site comprising a remote radio head (RRH) and a baseband unit (BBU) separated and connected via an optical feeder.

4. The test device of claim 3, wherein the test point is at a front haul of the baseband unit (BBU) or near the BBU of the cell site.

5. The test device of claim 1, wherein measuring time delay is based on a frequency-modulated continuous-wave (FMCW) technique.

6. The test device of claim 1, wherein calculating the distance to the PIM is based on time-distance resolution technique, and wherein the PIM comprises at least one of internal PIM and external PIM.

7. The test device of claim 1, further comprising an output to provide to a user at least one of visual data and audio data, the visual and audio data associated with the detected PIM or the calculated distance to the PIM.

8. A method to detect passive intermodulation (PIM) and measure distance to the PIM at a cell site, the method comprising:
    receiving, at a receiver, a signal from a test point of a cell site;
    replacing, by a processor, downlink IQ data in the signal with two-tone waveform IQ data, wherein the two-tone waveform IQ data is acquired from a single antenna or from two single tones from two separate antennas and represents a translation of amplitude and phase data from a polar coordinate system to a Cartesian (x, y) coordinate system;
    transmitting the two-tone waveform IQ data to a remote radio head (RRH);
    monitoring uplink spectrum to detect PIM, wherein the uplink spectrum comprises uplink IQ data from the RRH;
    performing uplink spectrum analysis using radio frequency (RF) monitoring;
    measuring a time delay for the two-tone waveform and the detected PIM, wherein downlink PIM affects uplink PIM; and
    calculating a distance to the PIM based on the time delay.

9. The method of claim 8, wherein the signal is a radio frequency over common public radio interface (RFoCPRI) signal, the signal comprising downlink IQ data.

10. The method of claim 8, wherein the cell site is a distributed cell site comprising a remote radio head (RRH) and a baseband unit (BBU) separated and connected via an optical feeder.

11. The method of claim 10, wherein the test point is at a front haul of the baseband unit (BBU) or near the BBU of the cell site.

12. The method of claim 8, wherein measuring time delay is based on a frequency-modulated continuous-wave (FMCW) technique.

13. The method of claim 8, wherein calculating the distance to the PIM is based on time-distance resolution technique, and wherein the PIM comprises at least one of internal PIM and external PIM.

14. The method of claim 8, further comprising providing to an output at least one of visual data and audio data to a user, the visual data and audio data associated with the detected PIM or the calculated distance to the PIM.

15. A non-transitory computer-readable storage medium having an executable stored thereon, which when executed instructs a processor to perform the method of claim 8.

16. A method to measure a distance to passive intermodulation (PIM), the method comprising:

monitoring, by a processor of a test device, uplink spectrum to detect PIM, wherein the uplink spectrum comprises uplink IQ data from a remote radio head (RRH), and wherein the PIM comprises at least one of internal PIM and external PIM and wherein downlink PIM affects uplink PIM;

performing uplink spectrum analysis using radio frequency (RF) monitoring;

measuring a time delay for a two-tone waveform IQ data transmitted to the RRH and for the detected PIM, wherein the two-tone waveform IQ data is acquired from a single antenna or from two single tones from two separate antennas and represents a translation of amplitude and phase data from a polar coordinate system to a Cartesian (x, y) coordinate system; and calculating a distance to the PIM based on the time delay.

17. The method of claim 16, wherein the test device is used at a cell site that communicates via a radio frequency over common public radio interface (RFoCPRI) signal.

18. The method of claim 16, wherein measuring time delay is based on a frequency-modulated continuous-wave (FMCW) technique.

19. The method of claim 16, wherein calculating the distance to the PIM is based on time-distance resolution technique.

20. A non-transitory computer-readable storage medium having an executable stored thereon, which when executed instructs a processor to perform the method of claim 16.

* * * * *